United States Patent [19]

Zlokarnik

[11] Patent Number: 4,534,862
[45] Date of Patent: Aug. 13, 1985

[54] APPARATUS FOR FLOTATION

[75] Inventor: Marko Zlokarnik, Cologne, Fed. Rep. of Germany

[73] Assignee: Bayer Aktiengesellschaft, Leverkusen, Fed. Rep. of Germany

[21] Appl. No.: 521,775

[22] Filed: Aug. 9, 1983

Related U.S. Application Data

[63] Continuation of Ser. No. 406,692, Aug. 9, 1982, abandoned, which is a continuation of Ser. No. 236,485, Feb. 23, 1981, abandoned.

[30] Foreign Application Priority Data

Mar. 5, 1980 [DE] Fed. Rep. of Germany ....... 3008476

[51] Int. Cl.³ .............................................. C02F 1/24
[52] U.S. Cl. .......................... 210/221.2; 261/DIG. 75; 261/123
[58] Field of Search ................................ 210/703–707, 210/220, 221.1, 221.2; 261/DIG. 75, 123, 78 A, 77

[56] References Cited

U.S. PATENT DOCUMENTS

| 3,642,618 | 2/1972 | Silva ..................................... 210/706 |
| 3,645,892 | 2/1972 | Schulman ............................ 210/706 |
| 4,044,079 | 8/1977 | Tveit ............................ 261/DIG. 75 |
| 4,162,970 | 7/1979 | Zlokarnik ................... 261/DIG. 75 |
| 4,162,971 | 7/1979 | Zlokarnik et al. .......... 261/DIG. 75 |
| 4,255,262 | 3/1981 | O'Cheskey et al. ............... 210/703 |
| 4,282,172 | 8/1981 | McKnight ................. 261/DIG. 75 |

FOREIGN PATENT DOCUMENTS 657918 9/1951 United Kingdom ................ 261/123

Primary Examiner—Benoit Castel
Attorney, Agent, or Firm—Sprung Horn Kramer & Woods

[57] ABSTRACT

The present invention relates to an apparatus for flotation, wherein the mixture to be subjected to flotation is mixed with gas, preferably air, inside a flotation cell, in funnel-shaped nozzles in which a conical deflector is arranged in line with the axis of the propulsion jet.

2 Claims, 8 Drawing Figures

APPARATUS FOR FLOTATION

This is a continuation of application Ser. No. 406,692, filed 8/9/82 which is a continuation of Ser. No. 236,485, filed 2/23/81, both now abandoned.

The present invention is related to an apparatus for flotation.

BACKGROUND OF THE INVENTION

The gas-liquid contacting device of a flotation cell usually has two purposes: to disperse the gas throughput into extremely small primary gas bubbles; and to create a field of shear stresses which causes the solid particles of the pulp to attach themselves to the gas bubbles. Stirrers embodying the rotor/stator principle are used preferentially for these purposes because they produce a high energy dissipation density within a very small space, but cause relatively little motion of the liquid outside the stator. The latter is necessary to ensure that the solid particles and gas bubbles, which become attached to one another in the mixing chamber within the stator ring, are not separated from one another as they rise to the surface.

Stirrers embodying the rotor/stator principle are described in, e.g., Ullmann, Encyklopädie der techn. Chemie, Vol. 2, 1972, and are either so designed that they suck in the gas themselves or receive the gas from a special gas-supplying device. As the rotational speed of the stirrer cannot be varied as desired under ordinary industrial conditions, the gas throughput is the only freely selectable process parameter that can be used to adjust the gas dispersing device to the flotation process. This lack of flexibility of the process parameters is undoubtedly a disadvantage of stirrers embodying the rotor/stator principle.

A further disadvantage of stirrers embodying the rotor/stator principle is the relative complexity of their design, which makes them very prone to wear. The reliability of many types of stirrer is also reduced by the fact that the bearings of the stirrer shaft are inside the pulp tank.

The aforementioned disadvantages of these gas dispersion devices for flotation cells presumably explain why efforts have been made for a number of years to develop what can be called a "stirrerless" flotation cell, cf., e.g., P. John, Aufbereitungstechnik 5 (1964) 10, 532–543. The reason why such cells have established themselves in exceptional cases only, is undoubtedly connected with the fact that the alternative gas dispersers, though able to produce fine gas bubbles, are unable to produce the shear stress field needed to couple the bubbles and solid particles, or they circulate the liquid in the cell so vigorously that the contact between the bubbles and solid particles is destroyed as the bubbles rise towards the surface.

Due to the last reason, the usual two-phase nozzles, for example, injectors, ejectors, Venturi nozzles, and jet nozzles, as described in DAS No. 2,458,449, DAS No. 2,166,595, DOS No. 2,410,570, DOS No. 2,408,064, and DOS No. 2,634,494, are unsuitable as gas distributors for flotation cells. They emit the gas/liquid dispersion as a powerful free jet which, though favourable to the mass transfer between the gas phase and liquid (absorption process), causes pronounced turbulence in the surrounding liquid.

SUMMARY OF THE INVENTION

The subject of this application is therefore an apparatus for flotation. In the process for the flotation of solids the mixture to be subjected to flotation is mixed with gas, preferably air, inside a floatation cell, in a funnel-shaped nozzle in which a conical deflector is arranged in line with the axis of the propulsion jet.

DETAILED DESCRIPTION OF THE INVENTION

Figure 1:
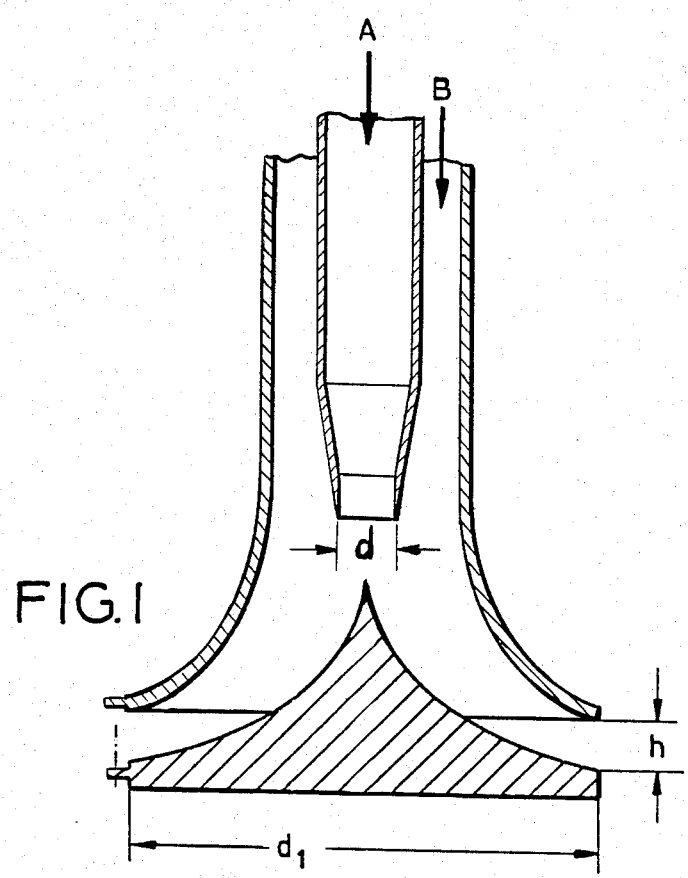
FIG. 1 is a sectional view of a nozzle according to the invention.

The flotation cell contains a funnel-shaped nozzle in which at least one conical deflector is arranged in a mixing chamber, the axis of the conical deflector being in line with that of the propulsion jet. The flotation cell cover is oblique on one side (FIG. 5) or on both sides (FIG. 6) and is preferably adjustable in height.

According to the invention, such funnel-shaped nozzles, several forms of which are described below, are used for flotation purposes in the flotation cell. According to the invention, the special funnel-shaped nozzles can be used, for example, in the dressing of ores, in the purification of waste water from either urban or industrial sources, and—generally—to separate solid/liquid or liquid/liquid systems in chemical processes, e.g. in dyestuff manufacture, i.e. in dyestuff separation by flotation. In the purification of waste water the funnel-shaped nozzles, according to the invention, are used to flotate solids, e.g. activated sludge or biomass, or solid constituents of waste water, including ones that are flocculated or have been precipitated. According to the invention, the flotation cell can be used for separation of liquid insoluble substances such as fats, oils, waxes etc. from aqueous solutions.

The deflector is approximately conical, the angle of the cone being between 60°–150° according to the intended application. The wall of the cone need not, however, be straight; instead it can be concave.

The purpose of such special funnel-shaped nozzles in flotation is to produce extremely small gas bubbles but to cause as little turbulence as possible in the tank.

For example, DOS No. 2,634,496 describes the use of several special injectors as gas dispersing devices in liquids. They can be used, according to the invention, as funnel-shaped nozzles. These have, as a common feature, a deflector in the axis of the propulsion jet nozzle, the effect of which is to deflect and fan out the liquid propulsion jet before it enters the mixing chamber. In consequence of this measure a larger proportion of the liquid throughput contributes to the gas dispersion than would otherwise. According to certain special designs, described in the aforementioned DOS, of these nozzles the liquid propulsion jet is fanned out by a rotationally symmetric body with a parabolically concave profile, deflected, and distributed evenly over the entire cross section of a funnel-shaped mixing chamber. The gas throughput, which is passed through this mixing chamber, is intimately mixed with the liquid and leaves the chamber over the entire circumference as a free jet consisting of the gas/liquid dispersion. which, after releasing its kinetic energy to the surrounding liquid, breaks down into a cloud of gas bubbles.

The subject of the present invention is also the use of the aforesaid special injector design as a gas dispersing device for flotation cells, i.e. as a funnel-shaped nozzle. Experiments with a gas dispersing device (FIG. 1) whose design represents a slight modification of that described in DOS No. 2,634,496 (FIG. 10) have shown—surprisingly—that under certain operating conditions the kinetic energy of the liquid propulsion jet is consumed to such an extent in consequence of the deflection of the jet, the dispersing action, and the enlargement of cross section, that only a short and weak free jet is formed. This free jet influences the flow of the liquid in the tank less than does the free jet that is produced by a stirrer embodying the stator/rotor principle.

At the same energy dissipation density the two devices give the same gas bubble size distribution. In this connection the sorption characteristics of a stirrer embodying the stator/rotor principle (a turbine stirrer with 12 blades, blade height 16 mm, stirrer diameter 80 mm; stator with 24 blades) and those of a funnel-shaped nozzle (corresponding to FIG. 1, propulsion jet diameter $d=10$ mm, diameter of the deflector $d_1=60$ mm; slot width $h=5$ mm), were determined, for which purpose a water/air system was used under steady-state conditions (so-called Hydrazine Method; cf. M. Zlokarnik, Advances of Biochem. Engng. 8 (1978), 133–151) and the coalescence behaviour of the system was varied by adding sodium chloride. The results of these measurements are represented by dimensionless numbers in the form of a graph in FIG. 2. The sorption number Y for mixing vessels is shown on the vertical axis; this number reflects the proportionality between the mass transfer coefficient $k_L a$ ($a=$volume-related interface, $k_L=$liquid-side mass transfer coefficient) and the volume-related gas throughput $q/V$ ($q=$gas throughput, $V=$volume), as valid for mixing vessels and a constant energy dissipation density (cf. M. Zlokarnik, Chem. Ing.-Techn. 47 (1975) 7, 281–282 and Advances of Biochem. Engng. 8 (1978), 133–151). The gas dispersion number X representing in a dimensionless form the gas throughput-related net power $P/q$ ($P=$power) of the stirrer or of the liquid jet, as applied to disperse the gas throughput ($\zeta$-density of liquid, $\nu=$kinematic viscosity of the liquid, $g=$acceleration due to gravity), is plotted on the horizontal axis. From the dependencies Y(X) for various degrees of coalescence of the system (expressed as the sodium chloride concentration of the water) it may be seen that the relationships Y(X) are practically identical for both devices at NaCl concentrations of 5 g/l and upwards, which means that the bubble size distributions are practically equal. It follows that the funnel-shaped nozzle produces the same primary bubbles as the stirrer embodying the stator/rotor principle. Only in a pure water/air system does the stirrer give higher Y values than the funnel-shaped nozzle. The explanation for this fact is that, as compared with the nozzle, the stirrer causes a more pronounced circulation of the liquid in the tank, with the result that the residence time of the gas bubbles is increased. A longer residence time is, however, unfavourable to the flotation process.

The use of a funnel-shaped nozzle as a gas dispersing device for flotation cells has many advantages over the use of stirrers embodying the stator/rotor principle. Thus, the funnel-shaped nozzle has two freely selectable process parameters: the gas throughput and the liquid throughput. The liquid throughput can be easily controlled with the aid of a by-pass. As may be seen in FIG. 1, the funnel-shaped nozzle has an extremely simple design; the deflector, which is more subject to wear, can be easily replaced when necessary.

In addition to the two freely selectable process parameters the funnel-shaped nozzle has a freely selectable geometrical parameter because the channel width can be varied as desired very simply and from the outside, even while the plant is operating, if necessary, by changing the distance between the deflector and the casing. This enables the funnel-shaped nozzle to be adapted optimally to the requirements of the flotation because by altering the channel width one can vary not only the suction performance of the funnel-shaped nozzle but also the kinetic energy of the free jet.

The fact that the funnel-shaped nozzle has no rotating parts enables the gas chamber to be sealed in a simple manner. This is particularly advantageous in the flotation treatment of chemical waste water, which often contains volatile organic media, and also enables the gas to be recycled in a simple manner if necessary.

By virtue of the great adaptability of the funnel-shaped nozzle its applications are by no means restricted to ore dressing. Its applications include ones which in the past have been reserved for dissolved air flotation and electroflotation, namely the purification of waste water and the removal of solids in biotechnology and in chemical processes.

Figure 3:
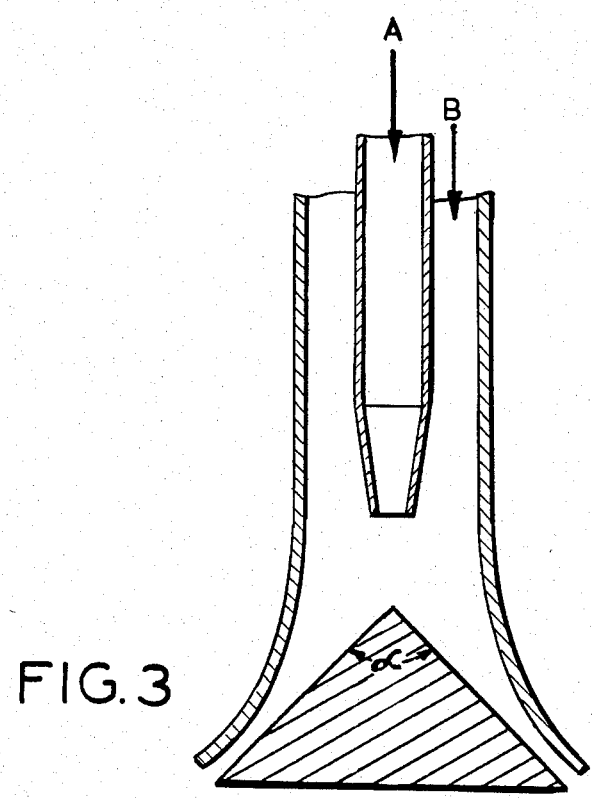
FIG. 3 is a sectional view of another nozzle according to the invention.
Figure 4:
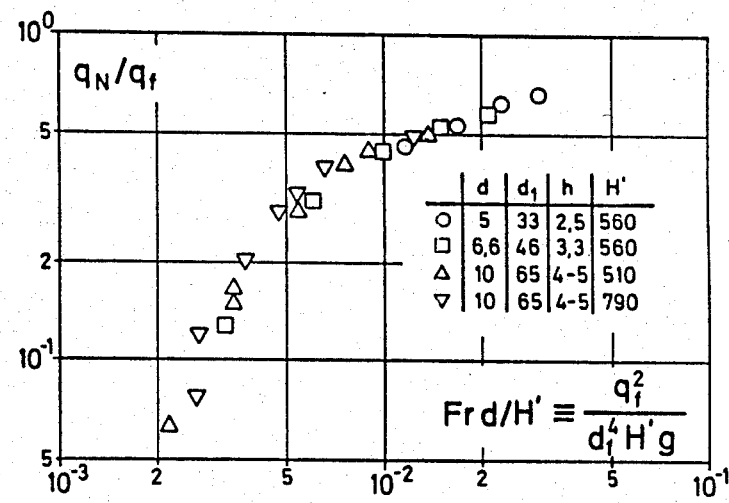
FIG. 4 is a graph of the gas throughput characteristic of the nozzle of FIG. 3.

In waste water purification by flotation the relatively small differences between the densities of the solid pollutants and the water and/or the fact that the particles are very small necessitates the use of extremely small gas bubbles and of a gas throughput which is smaller than that needed in other applications of funnel-shaped nozzles. Both of these requirements are easily met with the funnel-shaped nozzle, which in this case should preferably be of the self-aspirating type. In other applications, however, the gas can be supplied under pressure. The annular channel between the deflector and casing must be so long and so designed that, seen in the direction of flow, it acts first as a confuser (converging casing wall) and then as a diffuser (diverging casing wall). The simplest form of a self-aspirating funnel-shaped nozzle is shown in FIG. 3. The liquid enters at A and the gas at B. In this case the deflector is a cone with a triangular cross section through the symmetrical axis. The angle of the cone peak is about 60°–150°, but preferably 60°–120°, or still more preferably 90°–120°. The same is true of cones whose walls are not linear but concave. The casing at first approaches the deflector at an acute angle (thus representing a confuser); thereafter the slot width is constant, but the surface of the annular passage increases with the diameter (with the result that the passage acts as a diffuser here). The gas throughput characteristic of a funnel-shaped nozzle of this kind ($\alpha=90°$) is represented in accordance with the theory of similarity (cf. M. Zlokarnik, Chem.-Ing.-Techn. 38 (1966) 3, 357–366) in FIG. 4. The diagram represents measurements obtained for three funnel-shaped nozzles with different diameters, slot width h, and liquid heights H' above the nozzle in mm. It will be seen from the diagram that with each of the three funnel-shaped nozzles it is easy to obtain self-aspirated gas throughputs $q_N$ (under standard conditions: 20° C. and 1 bar) of 10%–50% of the liquid throughput $q_f (q_N/q_f = 0.1–0.5)$.

In a commercially produced embodiment of a funnel-shaped injector the liquid (propulsion) jet nozzle preferably has the form of a so-called plain orifice nozzle and has an internal diameter of $d \geq 10$ mm, which guarantees substantial freedom from blocking. For the same reason the width of the annular space ($\triangleq$ slot width) should nowhere be less than 5 mm. The ratio of the cone diameter $d_1$ to the nozzle diameter d should be $\geq 3$ and preferably 5–10.

Figure 2:
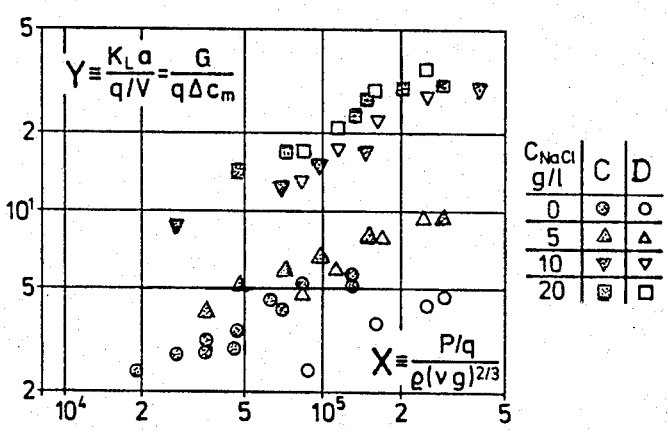
FIG. 2 is a graph of the gas dispersing behavior of the nozzle of FIG. 1.

The deflector situated in the funnel-shaped nozzle should be conical; in FIG. 1 it is a body with a parabolically concave profile; in FIG. 3 it has the simplest form of a cone whose angle is $\alpha = 90°$. If this angle is varied while the diameter of the cone remains constant, the length of the channel can be varied and hence the suction characteristics of the funnel-shaped nozzle can be influenced. Depending on the application it is usual to employ the cone angles indicated above.

Figure 5:
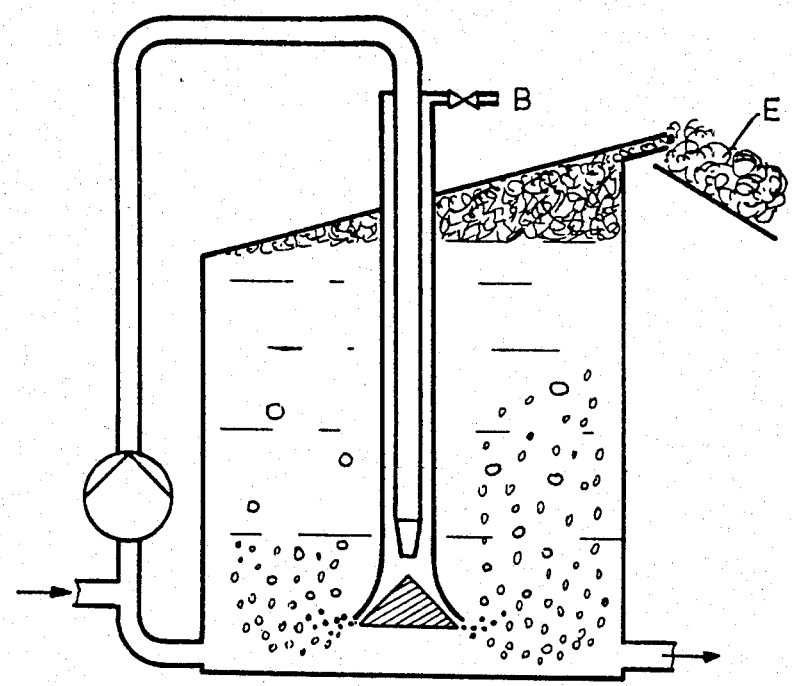
FIGS. 5–8 are flotation cells according to the present invention.
Figure 6:
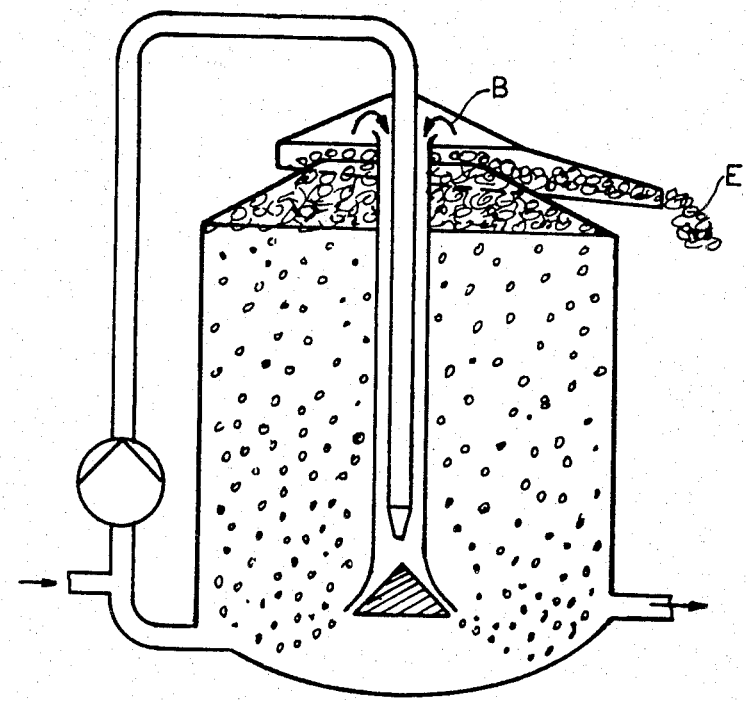

A flotation cell is generally provided with a foam skimmer (blade wheel) to remove the flotated solids. Such a device can also be used for a flotation cell with a funnel-shaped nozzle, especially when the solid is sticky and tends to adhere to the walls of the tank. But there are many cases, especially in the purification of waste water by flotation and in chemical processes, where it is desirable to prevent gases escaping from the flotation cell. In accordance with the invention it is therefore proposed that the cell cover be as shown in FIGS. 5 and 6. The flotated solid accumulates beneath the oblique cover and is pushed or pressed towards the funnel-shaped opening by the foam formed subsequently: The flotation cell is thus provided with automatic foam removal. By means of such foam removal potential off-gas problems (smell, inflammable gas mixtures, etc) can be solved without difficulty because the foam leaves at one single, narrowly defined place. In the embodiment presented in FIG. 6 after the foam has disintegrated the gas is also drawn in again by the self aspirating funnel-shaped nozzle and is thus recirculated.

Figure 7:
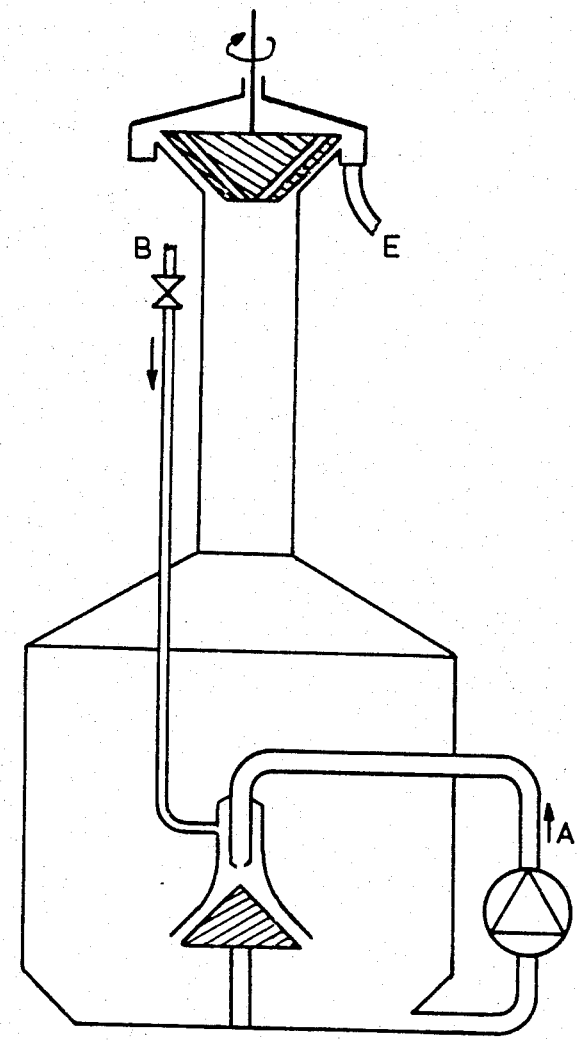

In the chemical industry flotation is sometimes applied in the case of substances which are very inclined to foam, and which produce a foam whose volume remains extremely constant (for example: the purification of wash waters containing pigment dyes, which have been used for cleaning production lines, filter cloths and vessels; the foam separation of surfactants from liquids). In such cases it is possible that considerable amounts of liquid are discharged from the substance together with the foam, which can disrupt the flotation process. According to the invention, by means of the cover, proposed in FIGS. 5 and 6 and the automatic foam removal it is easily possible to deal with extremely stable types of foam. In an arrangement according to FIG. 7 the foam is passed via a preferably vertical pipe in which it can remain for a considerably long period of time and dry out (fractionate) at the same time; at the top end of the pipe a mechanical foam breaker is fitted which at least partly liquefies the dried out foam.

Another method of obtaining froth which is as dry as possible is to increase the foam space above the liquid in the cell. To prevent such a method adversely affecting the flotation process itself—since such a method promotes remixing of the froth into the liquid, a process which works against the flotation process—it is proposed, according to the invention, that the cover of the flotation cell is designed so that it is adjustable in height. In this way the foam space which is most suitable for each case can be regulated during the flotation process and thus allowance can be made for the periodical fluctuation in the nature of the substances in the system.

In a continuously operated flotation process in a series of flotation cells (preferably constructed in the form of troughs) it can be expected that the first cell(s) will produce the most copious froth containing the most moisture.

In order to reduce the amount of foam this/these cell(s) should be equipped with a larger foam space than the others.

The "dehydration" of the froth in the flotation process is particularly important in cases in which the flotation is not only required to bring about a liquid/solid separation in the system but is also required to increase the concentration of the discharged solid. This task is, for example, presented in biological effluent purification in which the biomass (the "activated sludge") has to be held back by a suitable separation device in the activated sludge basin. The concentration of the activated sludge in the activated sludge basin can be higher, the greater its concentration in the separation device is. By sedimentation in the gravitational field sludge concentrations of 10–15 g/l are possible whereas a one step dissolved air flotation is required to produce sludge concentrations of 40 g/l.

Separation and increasing the concentration, for example, of activated sludge can also be conducted in a simple way by the described flotation apparatus according to the invention. Here it is recommended to conduct such a process in a series of flotation cells and not in one step. According to the invention it is proposed that the sludge to be discharged be passed through the series of flotation cells countercurrently to the liquid because by this method a far greater increase in the sludge concentration is achieved compared with the one step flotation.

It has already been indicated that the funnel-shaped nozzles allow very fine gas bubbles to be produced accompanied by a greatly suppressed flow of liquid in the cell. This property makes the flotation cell with the funnel-shaped nozzle particularly suitable for the flotation of very fine and/or light particles and of light and voluminous flocks. To suppress the pulp circulation in the cell to a greater extent particularly near the liquid/foam interface, it is proposed, according to the invention, that in the preferred embodiment one or more quiescence grids be fitted near the interface. Suitable quiescence devices are for example honeycomb type constructions, similar to the light scattering grids in lighting fixtures or bar grates for mine covers which extend over the whole cross-section of the flotation cell.

Figure 8:
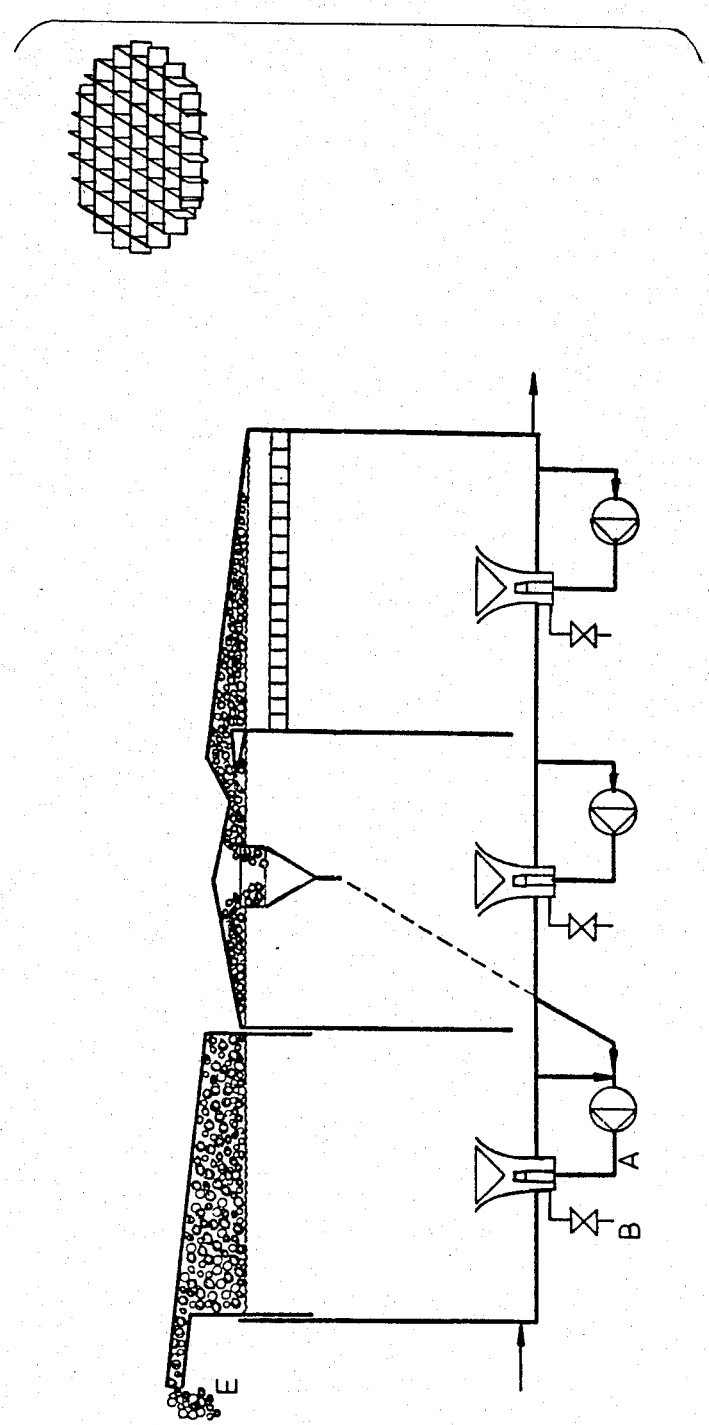

In order to illustrate the three last-discussed inventive concepts, which can considerably improve the mode of operation of the flotation cell with a funnel-shaped nozzle, FIG. 8 schematically shows a series of three flotation cells with funnel-shaped nozzles, in which (a) the first step shows a cover to the foam space which is adjustable in height
(b) the last step shows a quiescence grid and
(c) the froth is conducted countercurrently to the liquid.

In the flotation cells according to FIG. 8, the funnel-shaped nozzle is introduced from below and sprays radially upwards; this shows that this constructional variation is also possible.

The field of application of the flotation cell with the funnel-shaped nozzle and automatic discharge, as proposed according to the invention, includes all those instances in which solid/liquid separation is desired in which a non-damaging and/or selective separation of very fine and/or particular light particles or flocks is demanded. This is required for example in the flotation of very finely ground ores or in coal/clay separation just as much as it is required in the separation and increase in concentration of the biomass in the most varied microbiological processes and in biological effluent clarification. The closed compact method of construction, cf. FIG. 6 or 7 make it possible for the separation device to be sterilized and kept sterile if required.

The chemical industry provides an important field of application for the flotation cell with the funnel-shaped nozzle and automatic foam discharge. Here it will be able to be used both for mechanical effluent clarification of liquid/liquid and liquid/solid systems, and it will be a justifiable alternative to customary liquid/solid separation processes when the particle size of the solids is smaller than/equal to 100 μm and the solids concentration is below 20 g/l. For example, using the process according to the invention, the following separation operations have already been successfully conducted: recovery of organic and inorganic pigments, as well as of agents for crop protection from process waters, and the recovery of Raney-nickel.

The process according to the invention, as well as the apparatus according to the invention, are explained in more detail by way of the following examples. The following examples were all conducted with a cell (300 mm diameter, 300 mm height) with a funnel-shaped nozzle (d=6.6 mm, $d_1$=43 mm, α=90°) according to FIG. 3, and show the capacity of the flotation cell according to the invention in an illustrative manner.

EXAMPLE 1

The flotation of dye pigments (water-insoluble azo dyes with a particle size in the μm range) from production wash waters. Initial concentration: approx. 10 g/l. Flotation agent: 20 mg of a cationic polyelectrolyte per gramme of dye and 5 mg of an anionic collector per gramme of dye. Liquid throughput $q_f$ and self aspirated air throughput $q_n$ amounted to $q_n q_f^2 = 0.03$ m$^9$h$^{-3}$. After a test time of 30 minutes the dye was removed from the wash water to such an extent that no detectable amounts remained in the water, so that this could be recycled into another washing process. The froth had a dye concentration of 200 g/l.

EXAMPLE 2

Flotational removal of printers' ink from waste paper (deinking). Papier-mâché (daily papers ⅔, magazines ⅓) was introduced in a concentration of 20 g/l. The agents (foaming agents, collectors) customarily used for deinking were employed as flotation agents. Combination of the process parameters: $q_n q_f^2$ = 1.32; 1.85; 2.65 m$^9$h$^{-3}$. The flotation rate thus achieved can be defined by the flotation rate constant k (min$^{-1}$) thus the flotation kinetics are of the first order according to the time law. The k values corresponding to the above mentioned combinations of the process paramters are k=0.26; 0.38; 0.49 (min$^{-1}$). This proves that there is direct proportionality between k and $q_n q_f^2$. In order, for example, to obtain a prescribed 97% removal of the printers' ink flotation times of 13.5; 9.2; 7.2 minutes were required according to the stated combinations of the process parameters.

EXAMPLE 3

Flotational removal of bio-sludge from purified effluent. No flotation agents were used; the relationship k $q_n q_f^2$ was also confirmed in this case. Given an initial sludge concentration of approx. 10 g/l the following was for example found: k=0.1 min$^{-1}$ at $q_n q_f^2$=0.02 m$^9$h$^{-3}$.

After a flotation time of 30 minutes a sludge concentration of only 0.5 g/l still remained in the outgoing effluent. This corresponds to a 95% sludge removal. The sludge concentration of the froth was 30 g/l.

I claim:

1. In a flotation cell including means for dispensing a gas in a liquid, such means comprising a liquid propulsion jet nozzle arranged axially inside a gas-providing tube, the nozzle and tube ending in a funnel-shaped mixing chamber, the mixing chamber being formed by a funnel-shaped casing containing a conical deflecting element arranged in line with the axis of the propulsion jet, thereby forming an annular passage, the improvement wherein the funnel has a concave curvature over its entire length and the angle of the conical deflecting element is between 60° and 120° such that the annular passage has a first zone of decreasing cross-section followed by a second zone of increasing cross-section in the flow direction, wherein the ratio of diameter of the conical deflecting element ($d_1$) to the diameter of the jet nozzle (d) is more than 3, and wherein the jet nozzle diameter (d) is at least 10 mm and the width of the annular passage at the increasing cross-section (h) is at least 5 mm, whereby the nozzle acts as a confuser in the first zone and a diffuser in the second zone to obtain high self-aspirated gas throughputs.

2. A flotation cell according to claim 1, wherein the angle of the conical deflecting element is 90°.

* * * * *